United States Patent [19]

Graves

[11] Patent Number: 5,551,479
[45] Date of Patent: Sep. 3, 1996

[54] COMBINATION BALL AND CHECK VALVE

[76] Inventor: John G. Graves, 3107 S. Woodward Blvd., Tulsa, Okla. 74105

[21] Appl. No.: 317,662

[22] Filed: Oct. 5, 1994

[51] Int. Cl.⁶ .............................. F16K 51/00; F16K 5/00
[52] U.S. Cl. ................. 137/614.2; 137/315; 137/527.8; 251/315.12
[58] Field of Search .............. 137/614.2, 527.8, 137/315; 251/315.12

[56] References Cited

U.S. PATENT DOCUMENTS

| 784,067 | 3/1905 | Park | 137/614.2 |
|---|---|---|---|
| 3,491,796 | 1/1970 | Scaramucci | 137/614.2 |
| 4,223,697 | 9/1980 | Pendleton | 137/527.8 |
| 4,802,652 | 2/1989 | Kaniut et al. | 251/315.12 |

FOREIGN PATENT DOCUMENTS 957431  5/1964  United Kingdom ............... 137/614.2

*Primary Examiner*—A. Michael Chambers

[57] ABSTRACT

A combustion ball and check valve for control of fluids through a conduit includes a unitary valve housing having a longitudinal opening extending therethrough, a ball valve closure member disposed within the housing adjacent a first end thereof and a one-way closure member disposed within the housing adjacent a second end thereof, and in relative close proximity to the ball closure member. The combination ball and check valve provides savings in weight, space and cost over conventional separate valves.

8 Claims, 2 Drawing Sheets

COMBINATION BALL AND CHECK VALVE

BACKGROUND OF THE INVENTION

1. Field of the Invention

The present invention relates to valves used to control the flow of fluids within a conduit and, more particularly, to a combination ball and check valve.

2. Description of Related Art

Ball valves are used to alternately permit and prevent fluid flow through a conduit. Likewise, one-way or check valves are used to permit fluid flow therepast in a first direction and to prevent fluid flow therepast in a second direction. In many industrial applications valve seats within a ball valve and within a check valve must be serviced to prevent fluid leaks. A problem with this arrangement is that when the valve closure member of the check valve is to be serviced, all of the fluid and pressure within the conduit on both sides of the check valve must be drained. In conduits of much length between the valves, the need to drain all of the fluids and pressure on both sides of the check valve can be time consuming and costly, especially in petroleum refining operations. Additionally, when ball valves are to be serviced there is the same need to drain all of the fluid and pressure within the conduit on both sides of the valve to be serviced.

In the past both ball and check valves have been used adjacent one another, but there is the need for a valve that does not require the removal of the fluids and pressure within the conduit on both sides of the valve to be serviced. Also, there is a need for a valve that has redundant fluid closure features within a packaging that permits weight, space and cost savings over conventional single valves.

SUMMARY OF THE INVENTION

The present invention has been contemplated to overcome the foregoing deficiencies and meet the above described needs. Specifically, the present invention is a combination ball and check valve for control of fluids through a conduit. This combination valve is comprised of a valve housing, which can be formed as a unitary body, with a longitudinal opening extending therethrough. The housing also includes a one-way or check valve closure member disposed within the housing adjacent a second end thereof. A ball valve closure member is disposed within the housing adjacent a first end thereof, and a bore extends through the ball. The ball valve closure member is adapted to be rotated to a closed position wherein the ball valve closure member is in sealing engagement with an annular seat disposed within the housing to prevent the flow of fluid through the longitudinal opening, and adapted to be rotated to an open position wherein the bore within the ball valve closure member is brought into fluid communication with the longitudinal opening to permit the flow of fluid therepast.

The one-way closure member is adapted to be rotated by fluid flow to a closed position wherein the one-way closure member is in sealing engagement with a seat disposed within the housing to prevent the flow of fluid through the longitudinal opening in a first direction. The one-way closure member is also adapted to be rotated to an open position by fluid flow wherein the one-way closure member permits the flow of fluid therepast in a second direction.

With the combination valve of the present invention, fluid and pressure only needs to be drained from the conduit on only one side of the check valve because the other side is protected by the closed valve. Also, the respective valve closure members are sized and configured to permit them to be spaced relatively closely together. A single valve body is used so that savings are realized in weight, space and cost over a combination of a separate ball valve connected to a separate check valve.

DETAILED DESCRIPTION OF THE PREFERRED EMBODIMENTS

As has been briefly described above, the present invention is a combination ball and check valve for control of fluids through a conduit. The combination valve includes a valve housing with a longitudinal opening extending therethrough. A ball valve closure member is disposed within the housing adjacent a first end thereof, and a one-way closure member is disposed within the housing adjacent a second end thereof.

It should be understood that the term "ball valve" means any valve with a generally curved valve surface that interacts when rotated about an axis or when moved in one or more directions to be sealably engaged with a valve seat. It should be understood that while a ball valve is referred to, the benefits of the present invention can be achieved within valves of different styles, such as plug valves, gate valves, rotating disk valves, and the like. The term "check valve" means any valve that permits fluid flow in a first direction and prevents fluid flow in a second direction. Such check valves are usually operated by the pressure of the fluid flow alone, but can be assisted by an electro-mechanical device or a spring.

Figure 1:
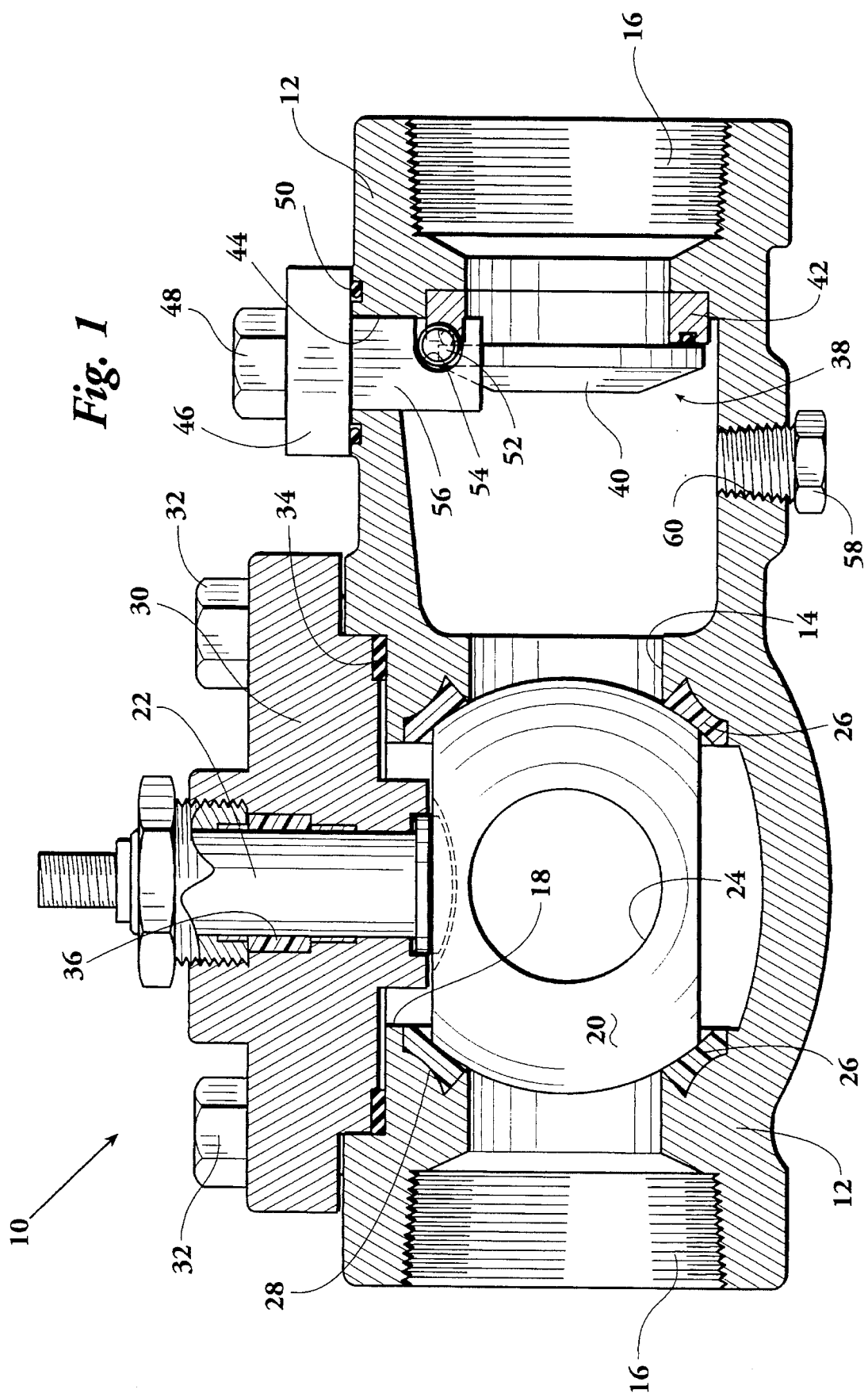
FIG. 1 is a side elevational view in cross-section of one preferred embodiment of a combination ball and check valve of the present invention.
Figure 2:
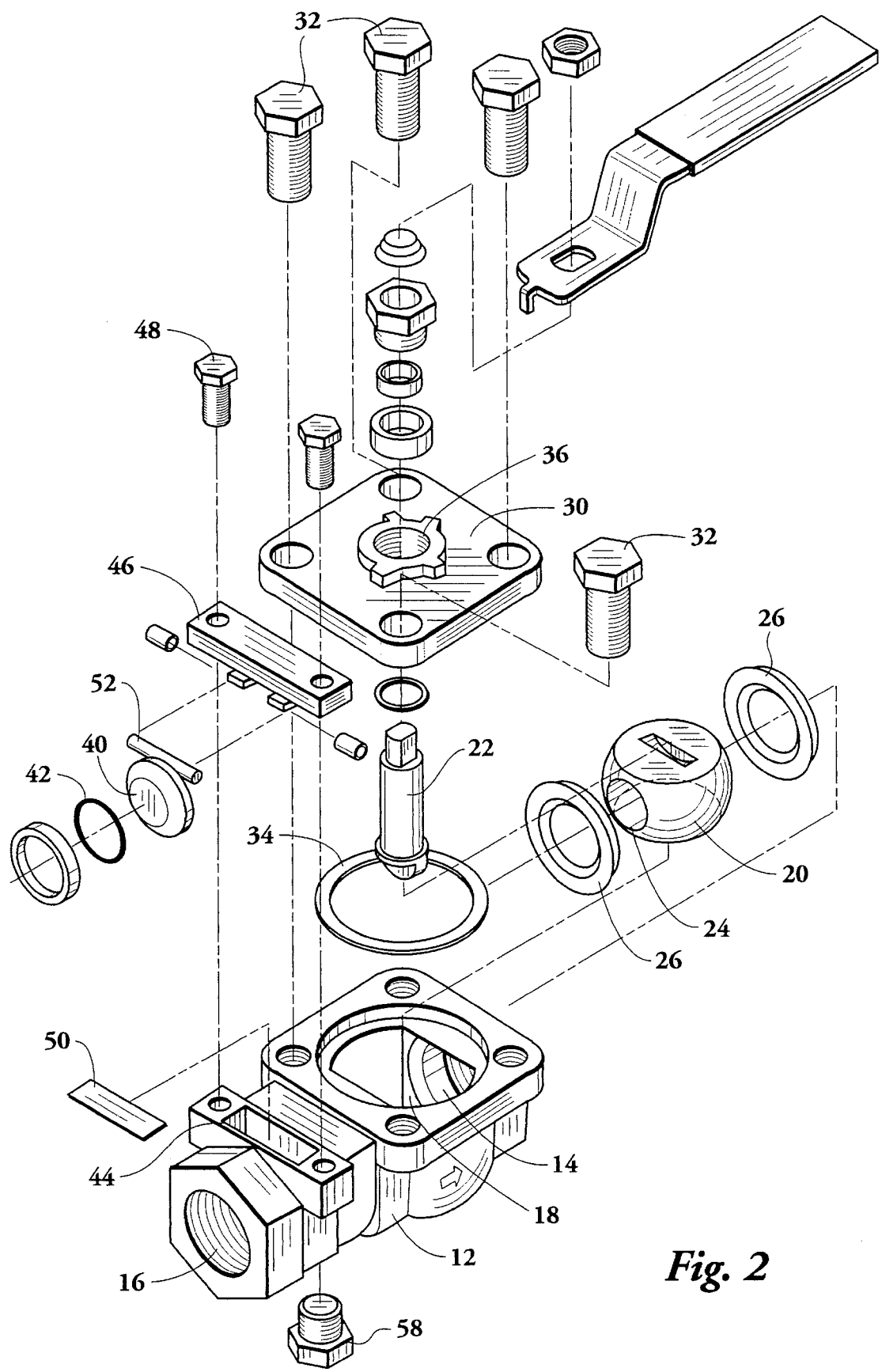
FIG. 2 is an exploded perspective view of the combination ball and check valve of FIG. 1.

As shown in FIG. 1, one preferred embodiment of a combination ball and check valve 10 of the present invention includes a valve body or housing 12 which can be formed or cast from any suitable material, such as brass, iron or steel. The housing 12 is in the form of a generally cylindrical member with a bore or opening 14 formed or drilled longitudinally therethrough. The housing 12 can be formed from several separate pieces and then assembled and held together by bolts, glue or welds. Preferably, the housing 12 is formed as a single, unitary body that is machined from a single piece of material or is cast as a single piece.

At a first end of the housing 12 and at an opposite, second end of the housing 12, coupling mechanisms 16 are provided for interconnection with a conduit (not shown). The coupling mechanisms 16 can be male and/or female threaded connectors, as are well known to those skilled in the art. Also, the coupling mechanisms 16 can be in the form of a decreased and/or an increased diameter section for connection (by interfitting) with the conduit by gluing, brazing, soldering or welding.

A first opening 18 is provided through the housing 12 adjacent the first end thereof, and the opening 18 is sized and configured to permit the insertion and the removal of a ball-type valve closure member 20 into the longitudinal opening 12. Specifically, the ball 20 is generally in the form of a sphere with a valve stem 22 extending outwardly therefrom, and has a fluid passage bore or opening 24 drilled or formed therein. The bore 24 in the ball 20 extends generally laterally therethrough and tangentially to the stem 22. The ball 20 is disposed within the housing 12 so that the rotation of the ball 20 about the axis of the stem 22 will rotate the bore 24 to be alternately in an "open" position in general coaxial alignment with the opening 14, and then to a "closed" position with the longitudinal axis of the bore 24 being transverse to the longitudinal axis of the opening 14.

One or more annular valve seats 26, formed from elastomeric material, ceramic material and/or metallic material, are disposed within recesses 28 within the housing 12. The ball 20 rotates in constant or intermittent sealing contact with the seats 26 to prevent fluid to leak past the ball 20. A removable bonnet 30, preferably in a generally circular configuration, is connected, such as by bolts 32, across the first opening 18, and is sealed by way of a gasket or O-ring 34 compressed between the outside surface of the housing 12 and a cooperatively shaped underside of the bonnet 30. The bonnet 30 includes a bore or opening 36 through which the valve stem 22 extends, and suitable valve gland packing materials are located within the bonnet 30 to prevent fluid leakage past the valve stem 22.

A one-way or check valve 38 is spaced from the ball valve and disposed adjacent an opposite, second end of the housing 12. The check valve 38 includes a disc or plate 40, oftentimes referred to as a "flapper", which is rotated into an open or retracted position by action of fluid flowing from the second end towards the first end of the housing 12. The flapper 40 is rotated into a closed position by action of fluid flowing from the first end towards the second end of the housing 12. When in a closed position, the flapper 40 is forced into sealing engagement with one or more elastomeric, ceramic and/or metallic valve seats 42 within the housing 12. The housing 12 includes a second bonnet opening 44 therethrough into which the check valve 38 is inserted and retrieved, preferably as a single unit.

A second bonnet 46 is connected across the opening 44 by bolts 48, and sealed to prevent fluid loss by way of a gasket or O-ring 50. The flapper 40 is hingedly connected to the bonnet 46 by coaxial pins 52 that extend laterally from a peripheral edge of the flapper 40. The pins 52 are received for rotational movement within recesses formed in the housing 12 or, preferably, within recesses 54 formed within lugs 56 that extend from a generally planar, lower surface thereof. This design allows the flapper 40 to be removed whenever the bonnet 46 is removed, and thus saves the operator from having to touch the flapper 40 or to insert fingers or tools into the valve housing 12 to remove the flapper 40.

The size and configuration of the second bonnet 46 and the flapper 40 are chosen so that they can be disposed in as close proximity as possible to the ball 20 and the ball bonnet 30. Preferably, the bonnet 46 is generally a rectangular configuration, rather than the usual circular configuration. The major axis of the bonnet 46 lies transversely to the longitudinal opening 14 to reduce the size and the cost of the valve 10.

The housing 12 includes a removable drain plug 58 that is inserted into a drain opening 60 within a sump area of the housing 12 between the ball 20 and the flapper 40. Should the conduit in which the valve 10 is installed accumulate debris or sediments, this drain plug 58 is removed to permit such debris and sediments to escape more quickly than conventional drain openings in ball valves and check valves. In operation, the ball 20 is rotated to a closed position and the drain plug 58 removed or opened to allow fluid flow from upstream of the flapper 40 to wash out the debris and sediments. When the pressure within the conduit on the upstream side of the flapper 40 has been reduced to atmospheric pressure, the flapper 40 will rotate by gravity to a closed position. The ball 20 is then rotated to an open position and fluid from the downstream side of the flapper 40 will then drain out of the drain opening 60. Since the flapper 40 has remained closed, the operator is assured that no flow of fluid and thus no debris or sediments have been permitted to move back past the flapper 40 and into the portion of the conduit that had previously been drained.

By utilizing a single body to house two valves, significant space, weight and cost savings are realized as compared to conventional installations of two separate valves. Another benefit is the redundancy or "back-up" protection of being able to rely upon either of two completely independent fluid control members, should one valve fail the other valve can be utilized to control the fluid flow.

Whereas the present invention has been described in relation to the drawings attached hereto, it should be understood that other and further modifications, apart from those shown or suggested herein, may be made within the scope and spirit of the present invention.

What is claimed is:

1. A combination ball and check valve for control of fluids through a conduit, comprising:

a valve housing having a longitudinal opening extending therethrough;

a ball valve closure member disposed within the housing adjacent a first end thereof, the ball valve closure member having a bore extending therethrough, and the ball valve closure member adapted to be rotated to a closed position wherein the ball valve closure member is in sealing engagement with an annular seat disposed within the housing to prevent the flow of fluid through the longitudinal opening, and adapted to be rotated to an open position wherein the bore within the ball valve closure member is brought into fluid communication with the longitudinal opening to permit the flow of fluid therepast;

a one-way closure member disposed within the housing adjacent a second end thereof, the one-way closure member adapted to be rotated to a closed position wherein the one-way closure member is in sealing engagement with a seat disposed within the housing to prevent the flow of fluid through the longitudinal opening in a first direction, and adapted to be rotated to an open position wherein the one-way closure member permits the flow of fluid therepast in a second direction;

a removable second bonnet sealably covering a second access opening in the housing adjacent the one-way closure member, the second opening sized to permit the insertion and removal of the one-way closure member; and the second bonnet and the second access opening are generally rectangular in configuration with a major axis thereof extending transversely to the longitudinal axis of the longitudinal opening.

2. A combination ball and check valve of claim 1 wherein the valve housing is a unitary body.

3. A combination ball and check valve of claim 1 wherein the valve housing includes at a first end and at a second end thereof means for interconnection with a conduit.

4. A combination ball and check valve of claim 1 wherein the housing includes drain means for permitting fluid within the housing between the ball valve closure member and the one-way valve closure member to be removed.

5. A combination ball and check valve of claim 4 wherein the drain means comprises a drain plug removably insertable within a drain opening provided through the housing and in communication with the longitudinal opening.

6. A combination ball and check valve of claim 1 wherein the housing includes a removable first bonnet sealably covering a first access opening in the housing adjacent the ball valve closure member, the first access opening sized to permit the insertion and removal of the ball valve closure member.

7. A combination ball and check valve of claim 1 wherein the one-way closure member is disposed within the housing along an imaginary plane transverse to a longitudinal axis of the opening within the housing.

8. A combination ball and check valve of claim 1 wherein the one-way valve closure member comprises a disk having hinge pins extending tangentially from a peripheral edge thereof, with the hinge pins received within recesses within a lower portion of the second bonnet.

* * * * *